June 4, 1940.  G. T. POLLARD  2,203,546
FLUID DRIVE DIFFERENTIAL TRANSMISSION
Filed March 29, 1939  2 Sheets-Sheet 1
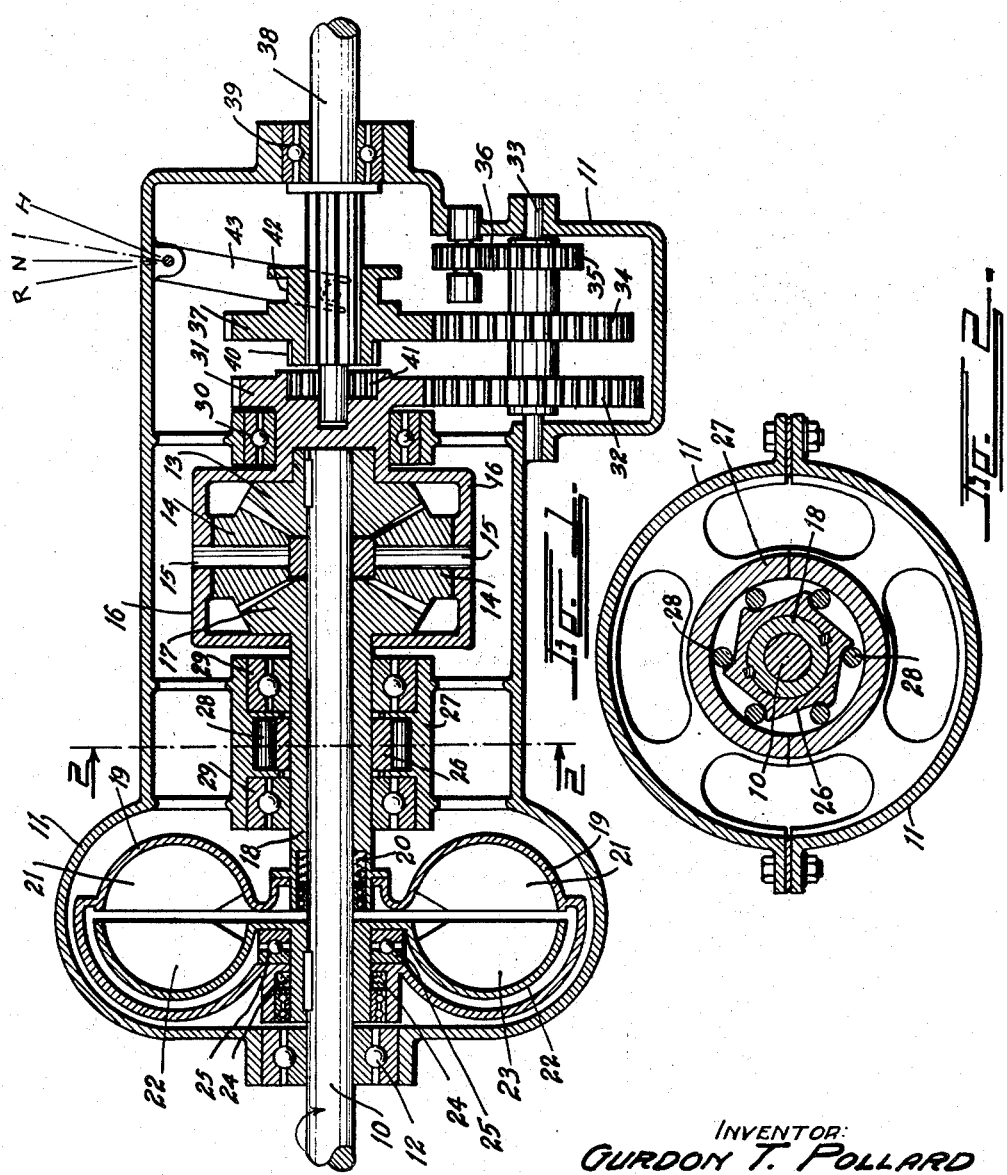
INVENTOR:
GURDON T. POLLARD
By
ATTORNEY June 4, 1940.  G. T. POLLARD  2,203,546
FLUID DRIVE DIFFERENTIAL TRANSMISSION
Filed March 29, 1939  2 Sheets-Sheet 2
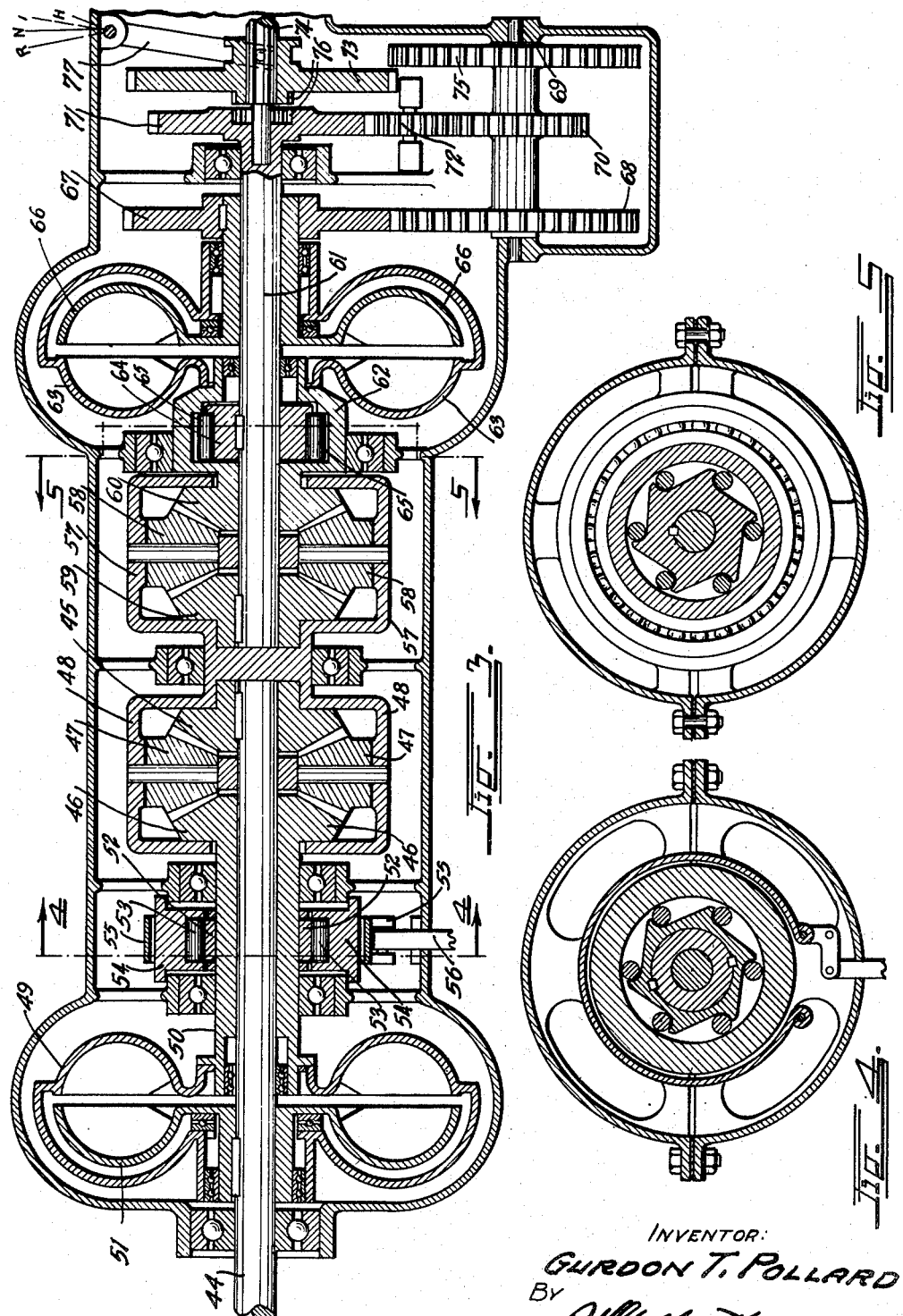
INVENTOR:
GURDON T. POLLARD
By
ATTORNEY Patented June 4, 1940

2,203,546

UNITED STATES PATENT OFFICE 2,203,546

FLUID DRIVE DIFFERENTIAL TRANSMISSION

Gurdon T. Pollard, Denver, Colo.

Application March 29, 1939, Serial No. 264,750

8 Claims. (Cl. 74—189.5)

This invention relates to an automatic automotive transmission device and has for its principal object the provision of a simple and efficient transmission mechanism, which will automatically bring the speed ratio from an infinitely low gear ratio to a direct drive ratio without requiring manual gear shifting.

A further object of the invention is to so construct the transmission device that it may be used, if desired, to provide an overdrive in addition to an underdrive, that is, it will automatically accomplish the same speed relations as if it had actually shifted its ratio from an infinitely low speed to a direct drive and then if the load is not excessive, will continue to advance these speed relations to an overdrive so that the driven shaft will be rotated more rapidly than the drive shaft; and to accomplish all these variable speed relations by uniform acceleration or flow of power.

A further object of the invention is to use relative speed differences in two or more fluid drives and so arrange the relative differences or varying slip or gradual pick-up as a slower or quicker clutching action and combining these in a useful relation for automatic power transmission. These useful relations are obtained either by the proportional sizes of the parts, by regulating the fluid density of the liquids or by varying the distance between the driving or driven parts within the fluid drive.

A further object of this invention is to adapt a transmission means to all intermediate speed ratios of an automobile engine so that the results of torque demand and power flow will be automatically supplied, without undue speeding of the engine, and its attendant waste of fuel.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 illustrates one form of the transmission device embodying only an underdrive ratio.

Fig. 2 is a cross sectional view taken on the line 2—2, Fig. 1.

Fig. 3 is a sectional view through a second form of the invention extended to provide both under drive and overdrive ratios.

Fig. 4 is a cross section through the second form, taken on the line 4—4, Fig. 3.

Fig. 5 is a similar cross section taken on the line 5—5, Fig. 3.

The improved transmission device is contained within a suitable oil tight case 11.

The underdrive portion of both forms of the invention is similar, and each employs a drive shaft 10. In an automotive vehicle, the shaft 10 may lead from a suitable clutch for connecting the shaft 10 to the engine shaft. The drive shaft 10 extends into the case 11 through a drive shaft bearing 12 and terminates in, and is keyed to, a drive sun gear 13 which is constantly in mesh with a series of planet gears 14.

The planet gears 14 are mounted upon suitable planet gear shafts 15 in a rotary planet housing 16 and are in constant mesh with a free sun gear 17 formed or mounted on the extremity of a tubular shaft 18 surrounding the drive shaft 10. The other extremity of the tubular shaft 18 carries a fluid housing 19. The fluid housing is sealed between the shaft 18 and the shaft 10 by means of suitable packing 20.

The housing 19 is formed with a series of internal paddles 21. A runner 22 is keyed to the shaft 10 and extends into the housing 19. The runner is provided with a series of baffles or paddles 23 which are in a closely spaced relation with the housing paddles 21. The housing 19 is sealed to a hub on the runner 22 by means of suitable packing 24 and a thrust bearing 25 is positioned to absorb the thrust between the runner and the housing.

An external roller ratchet member 26 is formed or secured on the tubular shaft 18 so as to rotate within an internal roller ratchet member 27 permanently fixed in the gear case 11. Suitable ratchet rollers 28 ride between the two ratchet members 26 and 27. The ratchet members are so faced as to prevent reverse rotation of the tubular shaft 18.

The tubular shaft is supported in suitable bearings 29 within the case 11 and the planet gear housing is similarly supported in bearings 30. The planet gear housing terminates in a power gear 31 for delivering the power from the automatic portion of the transmission.

A selective transmission, which may be similar to those at present in use, may be incorporated in the case 11. Such a transmission is illustrated in Fig. 1, wherein the power gear 31 is in constant mesh with a counter-shaft gear 32 on a counter-shaft 33. The counter-shaft also carries an intermediate gear 34 and a reverse gear 35. The reverse gear 35 is in constant mesh with a reverse pinion 36.

A shifting gear 37 is splined upon a driven shaft 38 extending through shaft bearings 39 in the case. The inner face of the shifting gear is formed with a male clutch boss 40 which can be brought into engagement with a female clutch socket 41 in the power gear. The other extremity of the shifting gear is formed with the usual shifting yoke groove 42 in which a shifting yoke 43 rides.

It can be seen that when the shifting gear 37 is in the position of Fig. 1, the power from the power gear 31 will flow through the gears 32, 34 and 37 to the driven shaft 38 driving the latter at reduced speed from the power gear 31. If the shifting gear is shifted to the left, it will be directly connected to the power gear and if shifted to the right, it will engage the reverse pinion 36 to reverse the shaft 38.

Let us assume that the engine is idling, that the gear 37 is in the position of Fig. 1, and that the car clutch is brought to engaged position. The shaft 10 will immediately start rotation to the right to rotate the runner 22 and the sun gear 13 to the right, the load on the driven shaft will hold the planet housing 16 stationary and the gear 13 will endeavor to act through the planet gears 14 to reverse the driven sun gear 17. It cannot reverse this gear, however, due to the fact that the ratchet rollers 28 prevent reverse rotation of the shaft 18.

Therefore, the planet gears will react against their shaft 13 to rotate the planet housing 16 forwardly at one-half speed. This one-half speed is transmitted through the intermediate gear 34 to the shaft 38 at still greater reduction of speed and, of course, increased power. The paddles 23 are now rotating with a forward thrust in the stationary fluid housing 19. As the speed of the shaft 10 increases, the reaction of the fluid in the housing will impinge the same against the paddles 21 tending to cause them to rotate in the forward direction with gradual acceleration. This rotates and accelerates the free sun gear 17 from a stationary position to a forward rotation. As the sun gear 17 begins to move forward, it will add its rotative effect to the rotative effect of the drive sun gear 13 on the planet gears 14 to cause the planet housing 16 to increase in forward speed, until a point is eventually reached when the runners 22 and the housing 19 are both rotating at substantially the same speed when the planet housing 16 will be carried around as a unit with its planet gears and the power gear 31 will be rotating at a 1–1 ratio with the shaft 10.

The operator can now shift the yoke 43 to engage the clutch faces 40 and 41. This immediately tends to slow the planet housing 16 and the fluid housing 19. The reaction of the runner in the fluid in the housing, however will cause the housing to again gradually pick up forward speed until it is again rotating in substantial synchronism with the runner 22 to place the shafts 10 and 38 again in a 1–1 ratio.

At any time that the load on the shaft 38 increases, sufficiently to overload the shaft 10, the reaction will tend to cause the free sun gear 17 to slow down and as it reduces its speed, it gradually decreases the speed ratio between the shafts 10 and 38. If this load still further increases, the free sun gear will come to rest so that the power gear 31 and the shaft 10 will be placed in a 1 to ½ ratio to pick up the load. As before stated, in this form of the invention, the sun gear 17 cannot reverse to bring the ratio below 1 to ½.

Overdrive form

In Fig. 3, a construction is illustrated whereby the same principles of operation are carried forward to provide an automatic overdrive as well as the above underdrive between the drive and driven shafts, and to provide still lower underdrive gear ratios.

In this form, the drive shaft is indicated at 44 terminating in a drive sun gear 45 which drives a free sun gear 46 through the medium of planet gears 47 in a planet housing 48.

In this form, also, the free sun gear 46 drives a fluid housing 49 by means of a tubular shaft 50 and the shaft 44 drives a runner 51 within the housing as in the previous form. In this form, however, the initial low ratio of 1–½ can be decreased to 1–0 so that the shaft 44 may initially rotate without imparting any rotation to the planet gear housing 48. This is accomplished by placing an external roller ratchet member 52 on the tubular shaft which acts through ratchet rollers 53 against a rotatable, internal ratchet member 54.

The rearward rotation of the ratchet member 54 can be retarded or retracted by means of a brake band 55 actuated through any suitable brake lever 56.

Operation of underdrive

Let us assume the shaft 44 is rotating forwardly with the engine idling. The planet gear housing 48 is held against rotation by the load of the car and the power is flowing through the planet gears to the free sun gear 46 causing it to rotate in a reverse direction. This causes the ratchet member 52 and the housing 49 to rotate reversely while the runner 51 is rotating forwardly.

Now let us assume that the brake lever 56 is operated to tighten the band 55. This gradually brings the outer ratchet member 54 to a stop and through the rollers 52 brings the tubular shaft 50 to a stop. This forces the planet gear housing 48 to rotate forwardly at one-half speed. The reaction of the fluid in the housing will now gradually cause the latter to pick up speed until the 1–1 ratio has been reached as in the previous form. Therefore, in this form of the invention we have a ratio of from 1–0 to 1–1.

It will be noted that even though the brake band be not tightened, the positive forward rotation of the runner will gradually bring the fluid housing to rest and then start to gradually accelerate it in a forward direction to the 1–1 ratio.

Overdrive construction

To obtain the overdrive, the planet housing 48 is connected directly to a second planet housing 57 carrying similar planet gears 58 which are in constant mesh with a driven sun gear 59 and a free sun gear 60. The driven sun gear 59 is fixed on the extremity of a driven shaft 61. The sun gear 60 is connected through a ratchet housing 62 to a second fluid housing 63. The shaft 61 carries an internal ratchet member 64 acting through ratchet rollers 65 against the ratchet housing 62. This ratchet prevents the sun gear 60 from exceeding the speed of the sun gear 59 for as soon as the ratchet housing tends to rotate faster than the ratchet 64, the rollers will lock the two together. This ratchet arrangement, however, allows the floating sun gear 60 to reverse in direction from that of the gear 59 without interference.

The second fluid housing 63 contains a runner 66 which is connected directly to a runner gear 67. The runner gear 67 is in constant mesh with a first counter-shaft gear 68 on a counter-shaft 69 which also carries a second counter-shaft and intermediate gear 70. The latter gear drives a fixed shaft gear 71 through the medium of a reverse pinion 72. A shifting gear 73 is splined on a power shaft 74 so that it may be brought either into mesh with a reverse gear 75 or into direct connection with the driven shaft 61 by means of clutch faces 76.

The gear 73 may be shifted through any of the usual shifting yoke levers 77 to three positions, a neutral position, N, a reverse position R, if moved to the right, and a forward position F if moved to the left, as illustrated in Fig. 3.

The gears 73 and 75 are simply for accomplishing reverse rotation of the shaft 74 at all of the ratios of the transmission.

The second fluid drive, 63—66, is arranged so that it will have a lower transmission efficiency than the first fluid drive, 49—51, so that in case of an overload it will "slip" before the first fluid drive does. This can be accomplished in any desired way, such as by having a lighter oil; having less or smaller paddles; or by greater spacing between the housing and the runner.

*Operation of overdrive*

Let us assume that the clutch faces 76 are engaged and the planet housing 48 is rotating forwardly at the same speed as the shaft 44. This forward rotation, of course, is carried to the second planet housing 57 causing the planet gears 58 to endeavor to rotate both of the sun gears 59 and 60 forwardly.

The load on the gear 59, however, tends to cause the planet gears 58 to speed up the gear 60. This gear, however, cannot increase in speed over the gear 59, due to the ratchet rollers 65, and the driven shaft initially rotates at a ratio of 1–1, with the planet housing 57.

The second fluid housing 63 is also rotating forwardly since it is fixed to gear 60. The shaft 61 through the gears 71, 72, 70, 68 and 67 rotates the latter gear in a reverse direction causing the runner 66 to rotate in a reverse direction in the housing 63.

The reaction of the fluid in the second housing 63 gradually imparts this reverse rotation to the housing, reversing the direction of the sun gear 60 to full rotation in a reverse direction with reference to the shaft 61 and driven sun gear 59. The sun gear 60 now transmits power through the planet gears 58 to the sun gear 59 causing the latter to rotate proportionally and gradually faster until the shaft 67 will finally have added rotation forwardly at a 1–2 ratio with the planet housing 57. The second fluid overdrive action to take place after the first fluid underdrive has reached its full drive relation of 1–1 ratio.

It will be noted that the entire operation is automatic, the torque delivered by the power shaft is in proportion to the load applied thereon and the relative speed of the power shaft increases inversely to the load. The brake band 55 and the reverse ratchets of the underdrive simply accelerate the pick-up through the lowest ratios but need not be used if complete automatic operation is desired.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An automatic power transmission device comprising: a driven member; planet gears supported from said driven member about its axis; a driven sun gear in constant mesh with said planet gears; a driven shaft secured to said driven sun gear; a free sun gear concentric with said shaft and in constant mesh with said planet gears; a two element slipping transmission device, one element thereof being fixed to said free sun gear; and means for driving the other element thereof from said driven shaft in a reverse direction relative to the rotation of said driven shaft.

2. An automatic power transmission device comprising: a driven member; planet gears supported from said driven member about its axis; a driven sun gear in constant mesh with said planet gears; a driven shaft secured to said driven sun gear; a free sun gear concentric with said shaft and in constant mesh with said planet gears; a two element slipping transmission device, one element thereof being fixed to said free sun gear; a tubular shaft surrounding said driven shaft, the other element of said transmission device being carried by said tubular shaft; and power transmission means between said driven shaft and said tubular shaft to rotate the latter relatively opposite from the former.

3. An automatic power transmission device comprising: a driven member; planet gears supported from said driven member about its axis; a driven sun gear in constant mesh with said planet gears; a driven shaft secured to said driven sun gear; a free sun gear concentric with said shaft and in constant mesh with said planet gears; a two element slipping transmission device, one element thereof being fixed to said free sun gear; means for driving the other element thereof from said driven shaft in a reverse direction relative to the rotation of said driven shaft; and directional clutch means between said driven shaft and said free sun gear so positioned as to prevent the latter from rotating at a higher speed than the former.

4. An automatic power transmission device comprising: a driven member; planet gears supported from said driven member about its axis; a driven sun gear in constant mesh with said planet gears; a driven shaft secured to said driven sun gear; a free sun gear concentric with said shaft and in constant mesh with said planet gears; a fluid housing rotated from said free sun gear; a runner in said fluid housing; and means for rotating said runner from said driven shaft in a direction opposite to the rotation of said driven sun gear.

5. An automatic power transmission device comprising: a driven member; planet gears supported from said driven member about its axis; a driven sun gear in constant mesh with said planet gears; a driven shaft secured to said driven sun gear; a free sun gear concentric with said shaft and in constant mesh with said planet gears; a fluid housing rotated from said free sun gear; a runner in said fluid housing; means for rotating said runner from said driven shaft in a direction opposite to the rotation of said driven sun gear; and directional clutching means positioned to prevent said fluid housing from rotating faster than said driven sun gear.

6. An automatic, ratio-changing, power transmission device comprising: a power shaft; a planet support surrounding said power shaft; means for receiving the rotative effort of said planet support; planet gears in said planet support; a driven sun gear fixed on said power shaft in constant mesh with said planet gears; a second sun gear in constant mesh with said planet gears; slipping transmission means between said drive sun gear and said second sun gear constantly urging the latter to rotate with the former; a directional clutch positioned to prevent said second sun gear from rotating reversely to said drive sun gear; and means for bringing said directional clutch into or out of its operative position.

7. In a planetary transmission of the type having a series of planet gears and means for revolving said series about the axis of, and in mesh with, a free sun gear and a driven sun gear, means for causing said driven sun gear to turn faster than said planet gears revolve comprising: a fluid transmission mechanism interposed between the two sun gears; and means for transmitting the rotation of the driven sun gear to said mechanism in a reverse direction so that said mechanism will urge said free sun gear to rotate in a direction opposite to the direction of revolution of said planet gears.

8. A fluid drive transmission comprising: a planet support; means for rotating said planet support; an annular series of planet gears carried by said support; a driven shaft supported coaxially of said series; a driven sun gear mounted on said shaft in constant mesh with said planet gears; a free sun gear rotatably mounted about said shaft in constant mesh with said planet gears; a directional clutch between said free sun gear and said shaft positioned to prevent the free sun gear from turning faster than the shaft but allowing reverse rotation of the former on said shaft; a two element fluid transmission device axially positioned about said shaft, one element thereof being connected directly to said free sun gear; and means for transmitting the rotation of the driven shaft to the other element of said device in a direction opposite to the direction of rotation of said driven gear so that said device will urge said free sun gear to rotate oppositely to the direction of rotation of said planet support.

GURDON T. POLLARD.